Figure 1:
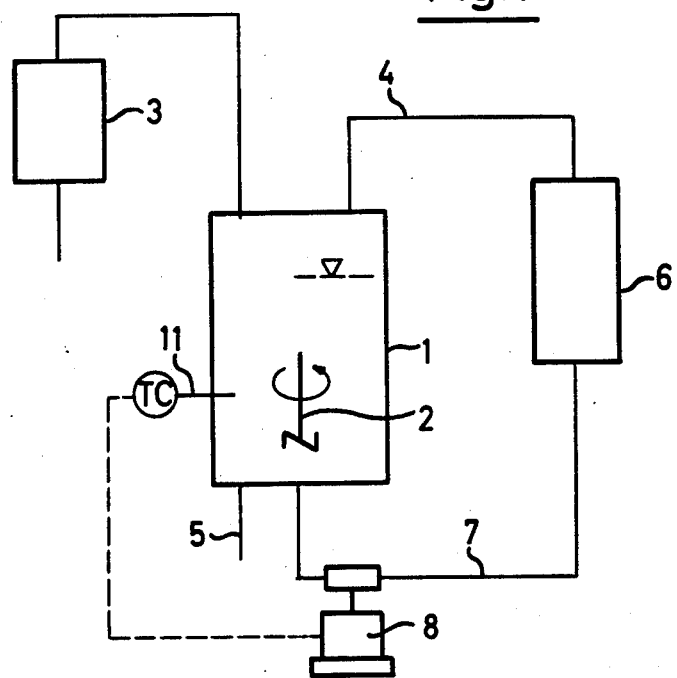

United States Patent [19]

Trieschmann et al.

[11] 4,012,573

[45] Mar. 15, 1977

[54] METHOD OF REMOVING HEAT FROM POLYMERIZATION REACTIONS OF MONOMERS IN THE GAS PHASE

[75] Inventors: Hans-Georg Trieschmann, Hambach; Karl-Heinz Ambil, Ludwigshafen; Wolfgang Rau, Heidelberg; Karl Wisseroth, Ludwigshafen, all of Germany

[73] Assignee: BASF Aktiengesellschaft, Ludwigshafen (Rhine), Germany

[22] Filed: Oct. 16, 1975

[21] Appl. No.: 623,019

Related U.S. Application Data

[63] Continuation of Ser. No. 349,213, April 9, 1973, abandoned, which is a continuation-in-part of Ser. No. 186,348, Oct. 4, 1971.

[30] Foreign Application Priority Data

Oct. 9, 1970  Germany ........................ 2049622

[52] U.S. Cl. .................. 526/68; 526/61; 526/67; 526/87; 526/88
[51] Int. Cl.² ................. C08F 2/34; C08F 10/00
[58] Field of Search ............... 526/61, 67, 68, 87, 526/88

[56] References Cited

UNITED STATES PATENTS

| | | | |
|---|---|---|---|
| 3,256,263 | 6/1966 | Wisseroth et al. | 260/94.9 P |
| 3,615,253 | 10/1971 | Warzel | 260/92.8 R |
| 3,625,932 | 12/1971 | Green | 260/92.8 R |
| 3,639,377 | 2/1972 | Trieschmann et al. | 260/94.9 P |
| 3,709,853 | 1/1973 | Karapinka | 260/94.9 P |
| 3,770,714 | 11/1973 | Dorschner et al. | 260/88.2 B |
| 3,944,534 | 3/1976 | Sennari et al. | 526/87 |
| 3,971,768 | 7/1976 | Peters et al. | 526/68 |

FOREIGN PATENTS OR APPLICATIONS

| | | | |
|---|---|---|---|
| 709,470 | 5/1965 | Canada | 260/94.9 P |
| 1,110,566 | 4/1968 | United Kingdom | 260/94.9 P |

*Primary Examiner*—Alan Holler
*Attorney, Agent, or Firm*—Johnston, Keil, Thompson & Shurtleff

[57] ABSTRACT

An improved method of removing heat from polymerization reactions of normally gaseous monomers in the gas phase comprising feeding the monomer in liquid form to a polymerization zone, immediately after entering said zone, removing a portion of said gaseous monomer from the polymerization zone, liquefying said portion of monomer by cooling it at the same pressure as that prevailing in the polymerization zone, recycling the liquefied monomer to the polymerization zone together with fresh monomer in liquid form and causing said liquid monomer to change to the gaseous form immediately after entering said zone. The improvement consists in not only condensing the monomer outside the polymerization zone but also storing the same, in keeping the temperature in the polymerization zone constant by regulating the rate at which liquid monomer is fed to the zone, and in keeping the temperature and pressure in the polymerization zone within limits conducive to the gaseous state of the monomer.

4 Claims, 3 Drawing Figures

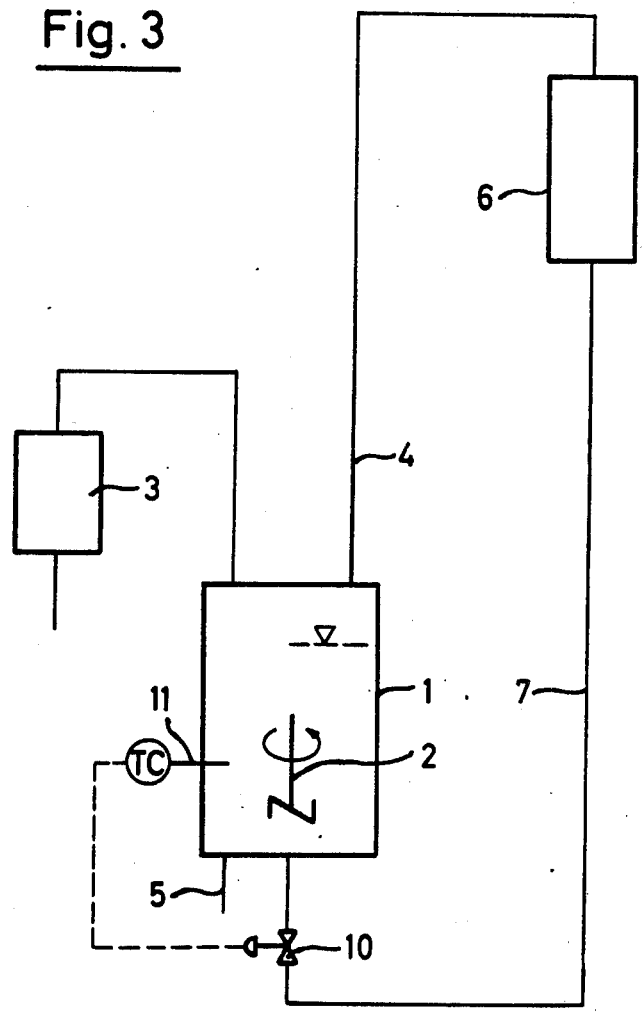

METHOD OF REMOVING HEAT FROM POLYMERIZATION REACTIONS OF MONOMERS IN THE GAS PHASE

This is a continuation of application Ser. No. 349,213, filed Apr. 9, 1973, now abandoned which is a continuation-in-part of our copending application Ser. No. 186,348, filed Oct. 4, 1971.

This invention relates to a method of removing heat from polymerization reactions of monomers in the gas phase in the presence of polymerization catalysts, comprising the removal of gaseous monomer or other material acting as heat transfer agent from the polymerization zone, liquefying said removed material and returning it to the polymerization zone in liquid form at a controlled rate to remove the heat of polymerization.

Chemical reactions which proceed with the evolution of heat, for example the polymerization of olefins or vinyl compounds, usually require special attention as regards heat removal when carried out on an industrial scale. This problem may become critical when the temperature of the reaction is near the softening point or even near the decomposition point of the reaction products or when the so-called energy output of the reaction per unit of volume assumes very high values.

The problem becomes particularly serious when the reactions, especially polymerizations, are carried out initially or entirely in the gas phase, where there is naturally no medium present for effecting efficient heat exchange by heat conduction.

Various methods have been described for the special case of removing heat from gas-phase polymerization processes. For example, the process described in German Pat. No. 1,013,870 effects heat removal by flash cooling, in which case the expansion properties of real gases are utilized (Joule-Thomson effect). According to another proposal, a reactant which is gaseous under the conditions of the reaction — for example the monomer itself — is removed from the reaction zone and recycled thereto in a liquefied form and then revaporized with the absorption of heat.

In gas-phase polymerizations care must usually be taken to ensure that no mush or paste forms in the reaction zone containing the pulverulent polymer, since such pastes could lead to agglomeration, for example in the case of the polymerization of propylene. Although the rate of heat removal may be regulated by controlling the rate of condensation in the reflux condenser, for example by varying the temperature of the cooling water, such a control circuit is relatively insensitive and cannot meet the requirements of, for example, a gas-polymerization with its frequently rapid fluctuations.

It is an object of the present invention to provide a method of removing heat from polymerization reactions of monomers in the gas phase in the presence of polymerization catalysts, in which the heat of polymerization may be removed in a controlled manner obviating the drawbacks of prior art processes for polymerizing monomers in the gas phase.

The object of the invention is achieved by removing gaseous monomer or other material serving as heat transfer agent from the polymerization zone in a closed system, liquefying said gaseous material by cooling it at the pressure used in the system and returning the liquefied monomer to the polymerization zone, wherein the temperature in the polymerization zone is held at a constant value by controlling the rate of feed of liquid monomer or other heat transfer agent and the temperature and pressure are maintained within specific limits conducive to the gaseous state of the monomer or other heat transfer agent.

This method has the important advantage that the rate of feed of the liquefied monomer or other heat transfer agent to the polymerization zone may be subjected to almost inertia-free control. This makes it easy to control the evaporation of the monomer or heat transfer agent so that the temperature and pressure remain within limits in which no state of saturation is reached. Thus the polymerization reaction proceeds in the "dry powder phase", since polymerization occurs with the monomers in the gaseous state only. In the method of the invention there is no adhesion of polymer particles to each other or to the walls of the reactor or the stirrer.

Our method is suitable for all monomers capable of being polymerized in the gas phase. It is thus particularly suitable for the polymerization of olefins of from 2 to 6 carbon atoms. The method has been used with particular success for the polymerization of propylene under conditions of high catalytic activity. The method is also eminently suitable for the manufacture of homopolymers or copolymers of vinyl chloride. In the case of olefin polymerizations, the catalysts are conveniently titanium halides and aluminum alkyl compounds of the Ziegler catalyst type or catalysts containing chromium oxide supported on a carrier. For the polymerization of vinyl chloride the catalysts used are organic peroxides or azo compounds, for example dilauroyl peroxide or azoisobutyronitrile.

In our method, gaseous monomer, optionally together with other gaseous material acting as heat transfer agent, is removed from the polymerization zone and cooled under the pressure prevailing in the polymerization zone so that it condenses, whereupon the liquid monomer is recycled to the polymerization zone at a controlled temperature. This procedure is thus carried out in a closed system in which monomer is circulated.

The temperature in the polymerization zone is kept constant by controlling the rate of feed of the liquefied monomers or heat transfer agents. This means in effect that if the temperature in the polymerization zone rises, the rate of feed of liquid monomer is increased so that the temperature is reduced to the desired value due to the increased evaporation of liquid monomer. If the temperature in the reaction zone drops, the rate of feed of liquid monomer is reduced so that the temperature rises to the desired value due to the reduction in the amount of monomer evaporating per unit of time.

The rate of flow of the vaporized monomer or heat-transfer agent should not exceed 10 cm/sec, preferably not 2 cm/sec. At this flow rate the pulverulent polymer in the polymerization zone is not fluidized and the polymer is thus prevented from entering the cooling zone with the gaseous monomer.

The polymerization zone is directly connected to a cooling zone consisting of a condenser cooling system which is also in the form of a storage unit containing, if necessary, an additional container for storing the liquid heat-transfer agent. The store of liquid monomer is adjusted automatically, as the cooling zone is connected to the reaction zone and is thus under the same pressure but, being cooled with a cooling agent for the purpose of condensing the heat-transfer agent, it has a very different temperature from the polymerization zone. Whereas the polymerization zone is thermodynamically in an overheated state in order to maintain the monomer or heat-transfer agent in the gas phase, the condenser cooling system is in a strongly chilled state. Thus this cooling system is always virtually filled with liquid (monomer and/or heat-transfer agent). When this liquid is recycled to the polymerization zone for the purpose of heat removal, the level of the liquid in the condenser cooling system tends to fall so that a portion of the cooling area becomes available for immediate condensation of further monomer or heat-transfer agent.

The liquid monomer or liquid heat-transfer agent is mixed in the polymerization zone with the pulverulent polymer with the aid of a stirrer and thus comes into direct contact with the polymer. The liquid monomer or liquid heat-transfer agent vaporizes in the polymerization zone because of the pressure and temperature conditions prevailing therein.

Optimum mixing of the monomer or heat-transfer agent and the pulverulent polymer is achieved when the output of the stirrer in the polymerization zone if from 10 to 35, preferably from 10 to 15, watts/liter of pulverulent polymer.

The stirrer, depending on its design, causes the polymer particles to flow upwardly at the edge of the polymerization zone and downwardly in the middle or vice versa. The "mean circulation time" is defined as the average time it takes the particles to return to the same point in the polymerization zone, and should advantageously be from 30 to 100 seconds.

Any non-condensable gases or vapors (e.g. hydrogen) present accumulate upstream of the condensing zone and may be readily removed from the system at this point.

To prevent the total system from monomer depletion due to polymerization and discharge, fresh monomer is added conveniently at such a rate that the pressure in the system remains constant.

Our method is particularly suitable for removing the heat of polymerization from those monomers having their critical temperatures and polymerization temperatures at points sufficiently above the temperature or ordinary cooling water (25° C). These requirements are met, in particular, by the gas-phase polymerization of propylene when carried out, for example, at 35 atmospheres and 95° C. The critical temperature of propylene is 92° C and this is sufficiently higher than the temperature of ordinary cooling water to make liquefaction under a pressure of 35 atmospheres an easy proposition. In the case of propylene polymerization, the pressure/temperature limits may be readily derived from the i, p diagram for propylene, as published for example in Chemie-Ingenieur-Technik, 33rd year (1961) No. 6, p. 419.

In the case of gas-phase polymerization of vinyl chloride at about 8 atmospheres and 65° C the method of the invention is equally possible, since the critical temperature of vinyl chloride is 158.4° C. Conveniently, the monomeric vinyl chloride is subjected to one of the following pressure/temperature combinations: 3 atm/25° C; 5 atm/40° C; 10 atm/70° C.

However, if ethylene were to be polymerized by the method of the invention, the removal of heat could only be effected by cooling the ethylene removed from the reaction zone with brine to temperatures below the critical temperature of ethylene (9.5° C).

Other substances which may be used as heat-transfer agents are those which are inert under the conditions of the polymerization, for example hydrocarbons such as propane and butene, provided the vaporization and liquefaction thereof may be effected with sufficient ease under the conditions of temperature and pressure used in the polymerization process.

Figure 2:
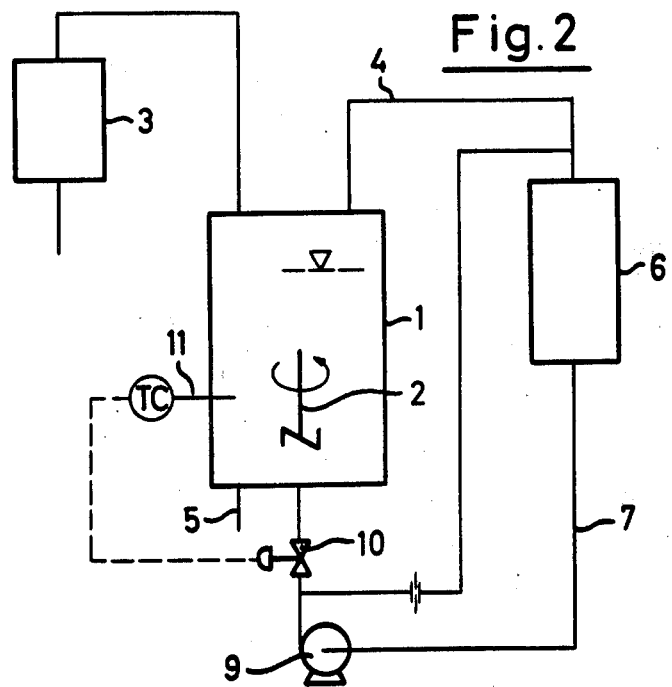

Advantageous apparatus for carrying out the process is illustrated in FIG. 1. This apparatus consists of a reactor 1 provided with a stirrer 2. The pulverulent polymer may be removed from the reactor by discharge means 3, which may be a cyclone for example. Gaseous monomer, optionally together with an added gaseous heat-transfer agent, is removed from reactor 1 through line 4 which is advantageously heated in order to avoid an uncontrolled reflux effect of condensing monomer. Fresh, normally liquid monomer is fed to the reactor through line 5. The monomer is liquefied in condenser 6 by cooling. The liquefied stored monomer may or may not be passed to a small container before being recycled to reactor 1 through a line 7 and a metering pump 88. The pumping action of the latter is controlled by a thermostat 11. When the temperature in the reactor rises, metering pump 8 forces monomer into reactor 1. When the temperature in reactor 1 drops, metering pump 8 is throttled. This controllable metering pump (piston pump) may be replaced, if desired, by a simple centrifugal pump. In such an embodiment, however, a control valve must be placed on the pressure side of the pump, which valve is itself controlled by the temperature in reactor 1 (FIG. 2).

Another advantageous apparatus for carrying out the method is illustrated in FIG. 3. A reactor 1 is equipped with a stirring device 2 passing through the base of the reactor and with discharge means 3 for the removal of polymer. Monomer is removed from the reactor through line 4. Fresh monomer is fed to the reactor through line 5. Monomer which has been liquefied in condenser 6 returns to reactor 1 via a control valve 10 controlled by thermostat 11. When the temperature in reactor 1 rises, the control valve 10 opens further, and when said temperature drops, valve 10 throttles down. In order to overcome the resistance to flow occurring in control valve 10 and line 7, condenser 6 is disposed at an appropriate height above reactor 1 so that there is an adequate static pressure differential. As a rule, the difference in height should be from 1 to 10 meters.

EXAMPLE 1

Propylene is polymerized in a reactor having a capacity of 5000 liters and equipped as shown in FIG. 1, at a pressure of 35 atmospheres and a temperature of 90° C. Separate feeds of 2.5 g/hr of titanium trichloride suspended in cyclohexane and 7.5 g/hr of aluminum triethyl in 10% solution in cyclohexane are maintained. The stirrer has an output of 15 watts/liter of pulverulent polymer, the mean circulation time being 60 seconds. Under the pressure conditions in the reactor, the propylene is liquefied in condenser 6 by water cooling. The liquid propylene is recycled to reactor 1 at its base by means of a pump 8 controlled by thermostat 11. The recycling rate is governed by the temperature prevailing in the reactor. About 2,000 kg of monomeric propylene are circulated through the system per hour. The rate of flow of the vaporized monomer is 1.5 cm/sec. The continuous yield of polymer is about 450 kg/hr. The monomer combined by polymerization is replenished through line 5.

The resulting polypropylene has an intrisnic viscosity of about 8.0 dl/g and about 30% by weight thereof is soluble in boiling n-heptane.

EXAMPLE 2

Gaseous vinyl chloride is polymerized at 3 atmospheres and 35° C in a 25 liter reactor equipped as illustrated in FIG. 3. The catalyst consists of 0.5 g/hr of acetyl sulfonyl cyclohexane peroxide and 0.25 g/hr of triethanolamine, which substances are fed to the reactor through separate pressure locks. The acetyl sulfonyl cyclohexane peroxide is diluted by 20 g/hr of powdered polyvinyl chloride, whilst the triethanolamine is in 10% solution in methylene chloride. For the removal of the heat of polymerization about 1.2 kg of monomeric vinyl chloride are recycled per hour, monomeric vinyl chloride being liquefied in condenser 6 by cooling to about 25° C. At the base of the reactor there is a control valve which is regulated by thermostat 11. Under continuous operating conditions, about 250 g of polyvinyl chloride are discharged through the discharge means 3 per hour.

The bulk density of the resulting polyvinyl chloride is 0.35 g/cm$^3$ and the K value according to Fikentscher is 65, equivalent to an intrinsic viscosity $\eta$ of 0.8 dl/g.

It is found that the pulverulent polyvinyl chloride does not agglomerate within the reactor under these conditions throughout the entire polymerization reaction and does not adhere to the walls of the reactor or to the stirrer.

EXAMPLE 3

Propylene is polymerized in apparatus as illustrated in FIG. 3 incorporating an 800 liter reactor. Separate feeds of 2.5 g/hr of titanium trichloride suspended in cyclohexane and 7.5 g/hr of aluminum triethyl in 10% solution in cyclohexane are maintained. The stirrer has an output of 10 watts/liter of pulverulent polymer, the mean circulation time being 50 seconds. 50 kg/hr of powdered polypropylene formed are removed from the apparatus through the discharge means 3. The pressure in the reactor is 35 atmospheres and the temperature is 95° C. Gaseous propylene leaving the reactor and fresh propylene introduced via line 5 is liquefied at normal temperature under the pressure of 35 atmospheres in condenser 6 which is situated about 6 meters above the reactor. Liquid propylene is fed to the reactor through a control valve 10 which is disposed at the base of the reactor and which is controlled by thermostat 11. About 220 kg/hr of material are circulated. The rate of flow of the vaporized monomer is 0.8 cm/sec.

Under these conditions of operation, it is found that no condensation takes place in the reactor and that only pulverulent polymer is present in the reactor throughout the reaction.

The resulting polypropylene has an intrinsic viscosity of about 8.0 dl/g and about 30% thereof is soluble in boiling n-heptane.

EXAMPLE 4

Ethylene is polymerized in the gas phase in apparatus as illustrated in FIG. 3 incorporating a reactor having a capacity of 300 liters which is filled to the extent of about 80% with pulverulent polymer. Under continuous operating conditions 1 g/hr of catalyst consisting of an aluminum silicate carrier modified with 5% by weight of chromic acid is metered into the reactor. The pressure in the reactor is 35 atmospheres and the temperature 105° C. 15 kg of ethylene polymerizes per hour, the resulting dry powder being removed from the reactor via discharge means (3). To absorb the heat of polymerization, 75 kg/hr of liquefied cyclohexane cooled to room temperature is fed from condenser 6 to the reactor via control valve 10; the cyclohexane evaporating from the pulverulent bed agitated by the stirrer escapes from the reactor and condenses again in condenser 6 where it is recooled.

The loss of cyclohexane caused by removal of the polymer is made up as required.

The linear polyethylene obtained has an intrinsic viscosity of 4.0 dl/g.

We claim:

1. In an improved method of removing heat from the polymerization reactions of monomers in the gas phase in which gaseous or liquid monomer optionally together with an inert liquid heat-transfer agent is introduced into the polymerization zone, pulverulent polymer is removed therefrom and gaseous monomer or gaseous inert heat-transfer agent, is removed from said polymerization zone, liquefied by cooling under the pressure prevailing in the polymerization zone and reintroduced in the liquid state into the polymerization zone, the improvement which comprises:

a. condensing and storing said monomer or heat-transfer agent outside the polymerization zone, while the temperature in the polymerization zone is kept constant by regulating the rate of reintroduction of the liquid monomer or heat-transfer agent into the polymerization zone;

b. mixing the liquid monomer or liquid heat-transfer agent with the pulverulent polymer within said polymerization zone, said liquid monomer or said liquid heat-transfer agent coming in direct contact with said pulverulent polymer before said monomer or said heat-transfer agent vaporizes;

c. controlling the rate of flow of the vaporized monomer or heat-transfer agent so that it does not exceed 10 cm/sec/;

d. maintaining the pressure and temperature in the polymerization zone being at such a level that the vaporized monomer or heat-transfer agent remains in the gaseous state;

e. stirring said pulverulent polymer in said polymerization zone with a stirrer having an output of from 10 to 35 watts/liter of pulverulent polymer; and f. the mean circulation time of the polymer particles in the polymerization zone is maintained at from 30 to 100 seconds.

2. A method as set forth in claim 1 wherein propylene is polymerized and is re-introduced in the liquid state to the polymerization zone.

3. A method as set forth in claim 1 wherein the rate of flow of the vaporized monomer or heat-transfer agent does not exceed 2 cm/sec/ and wherein the output of said stirrer is from 10 to 15 watts/liter of pulverulent polymer.

4. The process set forth in claim 1 wherein said monomer is an olefin containing from 2 to 6 carbon atoms.

* * * * *